Jan. 1, 1963   N. E. ANDERSON ET AL   3,071,680
ARC WELDING
Filed June 17, 1960   2 Sheets-Sheet 1
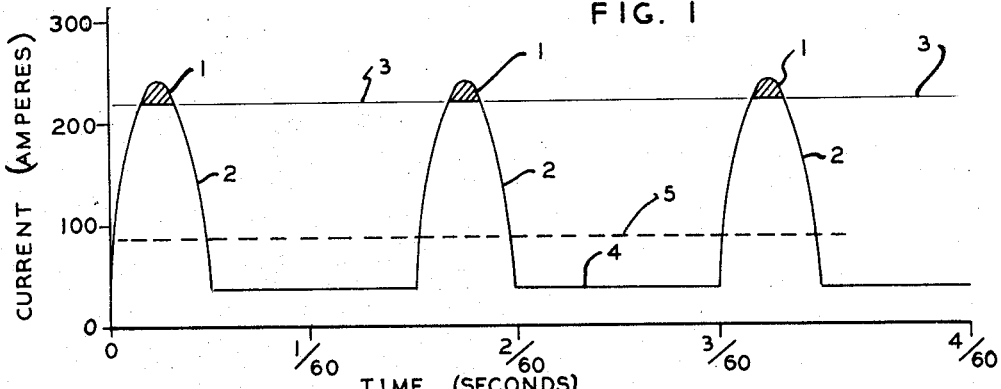
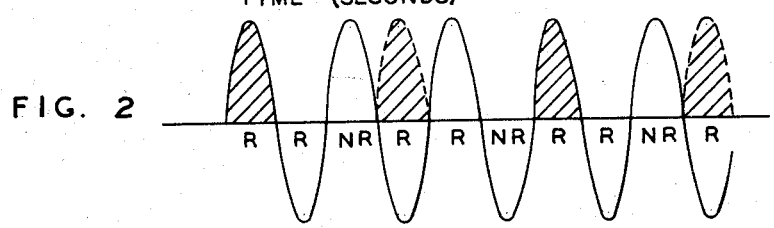
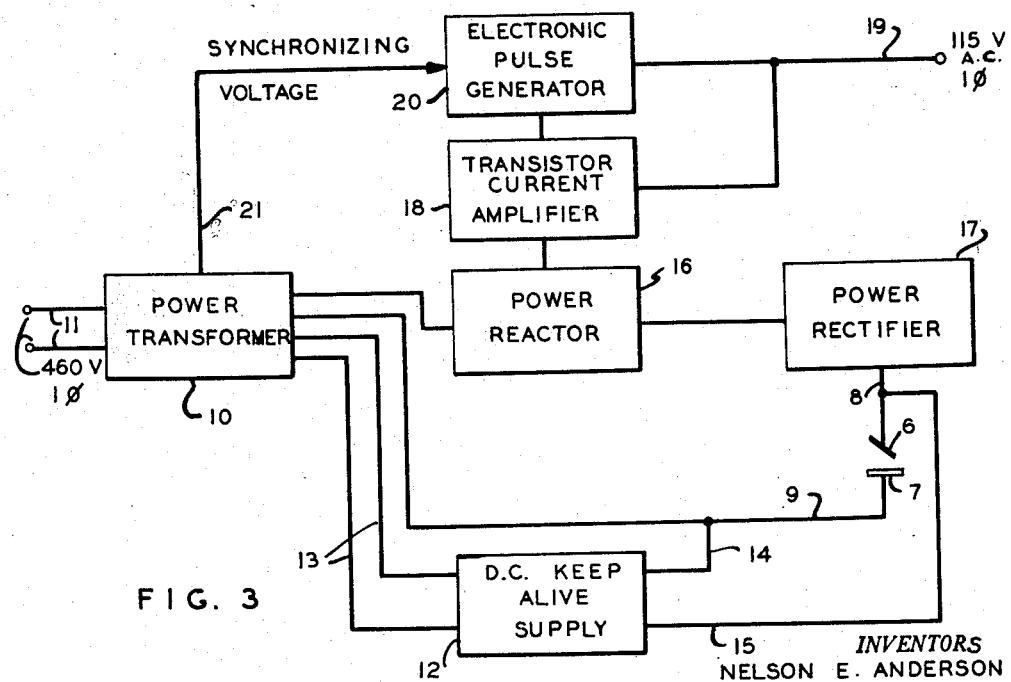
INVENTORS
NELSON E. ANDERSON
WILLIAM J. GREENE
BY
Leslie C. Byer
ATTORNEY INVENTORS
NELSON E. ANDERSON
WILLIAM J. GREENE
BY
*Leslie C. Byer*
ATTORNEY

United States Patent Office 3,071,680
Patented Jan. 1, 1963

3,071,680
ARC WELDING
Nelson E. Anderson, Berkeley Heights, and William J. Greene, Scotch Plains, N.J., assignors to Air Reduction Company, Incorporated, New York, N.Y., a corporation of New York
Filed June 17, 1960, Ser. No. 36,933
30 Claims. (Cl. 219—131)

This invention relates primarily to methods and apparatus for reducing the high melting rate of electrode material and the high energy input to the weld heretofore associated with arc welding under conditions productive of an axial spray deposit of weld metal from a consumable electrode to the workpiece.

An axial spray transfer of weld metal is obtained in high current density metal arc welding in an inert gas atmosphere under conditions described and claimed in United States Letters Patent No. 2,504,868 to Albert Muller, Glenn J. Gibson and Nelson E. Anderson, granted April 18, 1950. In accordance with the disclosure in this patent a bare electrode is used with reverse polarity direct current. Axial spray transfer of weld metal may also be achieved when welding with straight polarity direct current and with alternating current when the electrodes are suitably treated with specified activating agents as disclosed and claimed in United States Letters Patents Nos. 2,694,763 and 2,694,764, both to Albert Muller and both granted November 16, 1954. Axial spray deposit of weld metal is also obtainable in a carbon dioxide atmosphere under conditions described and claimed in United States Letters Patent No. 2,932,722 to Alexander Lesnewich and Everett H. Cushman and United States Letters Patent No. 2,932,723 to Craig R. Sibley and Alexander Lesnewich, both granted April 12, 1960. In each case the axial spray transfer of weld metal is substantially spatter free, develops deep weld penetration and is associated with an arc having self regulating characteristics.

Axial spray transfer of weld metal occurs in high current density arc welding when the welding current is above some minimum value, referred to hereinafter as the transition current, at which the molten drops of metal released from the consumable metal electrode suddenly increase in number with the concurrent reduction in their size and are forcefully projected axially from the end of the electrode to produce this axial spray. Spray arcs are more stable than arcs operating at current values below the transition current where the globular transfer of weld metal is largely misdirected, produces short-circuits in the arc, and results in much spatter of weld metal.

In the spray arc the metal is transferred in line with the electrode even when the electrode is at an angle with respect to the workpiece. The stiffness of the arc and the small size of the drops are highly advantageous since the drops can be easily directed into horizontal fillet welds or into overhead groove welds without affecting the arc behavior. In addition the concentration of energy in the central region of the arc and the kinetic energy of the metal drops striking the weld pool produce deep weld penetration. This latter feature is not always desirable for out-of-position welding since the very fluid superheated weld metal produced by the axial spray at high current densities is too fluid to be selfsupporting and is consequently difficult to control. Furthermore, the high energy input into the weld at such high current densities limit the application of spray arcs to the welding of heavy sections and makes it difficult, if not impossible, to weld thin gauge material without producing melt throughs during welding.

The transition current above which spray transfer occurs can be modified somewhat by the proper control of a number of variables, the most important of which are electrode composition and diameter, the extension of the electrode beyond its current contact, in some cases the type and degree of electrode activation, and the electrode polarity. As can be readily seen, reducing the diameter of the electrode and increasing its extension beyond its current contact impose practical limitations to the employment of these variables for controlling the magnitude of the transition current. Furthermore, control of the stickout and diameter of the electrode may not prove to be effective in reducing the melting rate of the electrode for although the transition current is reduced the increase in resistance heating of the stickout may result in no reduction in the melting rate of the electrode. In any case since the transition current may be quite high, spray transfer is associated with high melting rates and a high energy input to the workpiece and the weld pool. These combined factors consequently limit the application of wolding with axial spray transfer of weld metal to heavier work thicknesses and make position welding difficult.

It is an object of this invention to provide methods and apparatus for reducing the arc current and melting rate of a consumable arc welding electrode.

It is a further object of this invention to provide methods and apparatus for welding with a pulsating current having recurrent values of sufficient magnitude to transfer fused electrode metal to a workpiece only during said values and between which the value of current flow and the duration thereof is insufficient to cause any transfer of fused electrode metal although it is great enough to maintain the arc and may be great enough to cause some melting or fusion of the electrode.

It is also an object of this invention to provide methods and apparatus for obtaining spray transfer of weld metal from an electrode to a workpiece during only a part of the total operating time of the arc and thereby for reducing the melting rate of the electrode and the energy input to the weld.

It is also an object of this invention to reduce the welding current to levels suitable for welding thin sections and for out-of-position welding, while retaining spray transfer.

It is also an object of this invention to provide methods and apparatus for supplying welding current to large diameter electrodes for achieving spray transfer at the lower currents which are characteristic of small diameter electrodes so that a desired electrode melting rate and energy input to the weld may be obtained without decreasing the size of the electrode by an amount which would add substantially to its cost and the difficulty of using it in automatic apparatus.

These and other objects and advantages of the invention will be pointed out and become apparent from the following description thereof.

In accordance with the present invention welding current is supplied to the arc in the form of discrete pulses rather than continuously as in past practice. The amplitude of the pulse current is made greater than the transition current to thereby produce axial spray transfer of weld metal while the root mean square and average current values are less than the continuously supplied currents above the transition current which have heretofore been employed for producing an axial spray transfer of weld metal. Thus, the melting rate of the electrode and the energy input to the workpiece are reduced by employing spray producing values of current flow during a part only of the total operating time of the welding arc. The flow of current during each pulse may be suitably initiated by the voltage of the pulse, by the use of a superimposed arc starting voltage, or by maintaining the arc by supplying it with keep-alive current which is sufficient to maintain the arc without causing a transfer of metal from the electrode to the workpiece. To accomplish this last procedure, the arc time between successive spray producing current pulses must be of such duration as to terminate before a globule of molten metal can form and transfer across the relatively low current arc.

It is to be understood, however, that under certain operating conditions, when it is desirable to obtain the deep weld penetration secured by high current arcs while yet avoiding an increase in the electrode melting rate, the average or root mean square value of the pulsed welding current may be above the transition current. Also the keep-alive current between pulses may be sufficient to melt the end of the electrode so long as it is insufficient to cause any transfer of fused electrode metal to the workpiece. The magnitude of the current pulses may thus be reduced by obtaining some melting or fusion of the electrode between the current pulses which cause a transfer of molten metal from the electrode to the workpiece.

This invention will be further described and explained in detail in connection with the accompanying drawings in which:

FIG. 1 shows a typical wave-shape of the pulsed current that may be used in practicing the invention;

FIG. 2 shows the reset and conduction scheme of a magnetic amplifier employed for obtaining current flow at a pulse rate of 40 per second from an alternating current source of supply;

FIG. 3 shows in block diagram the salient components of a pulse power control apparatus embodying the magnetic amplifier and suitable for practicing the invention.

Figure 4:
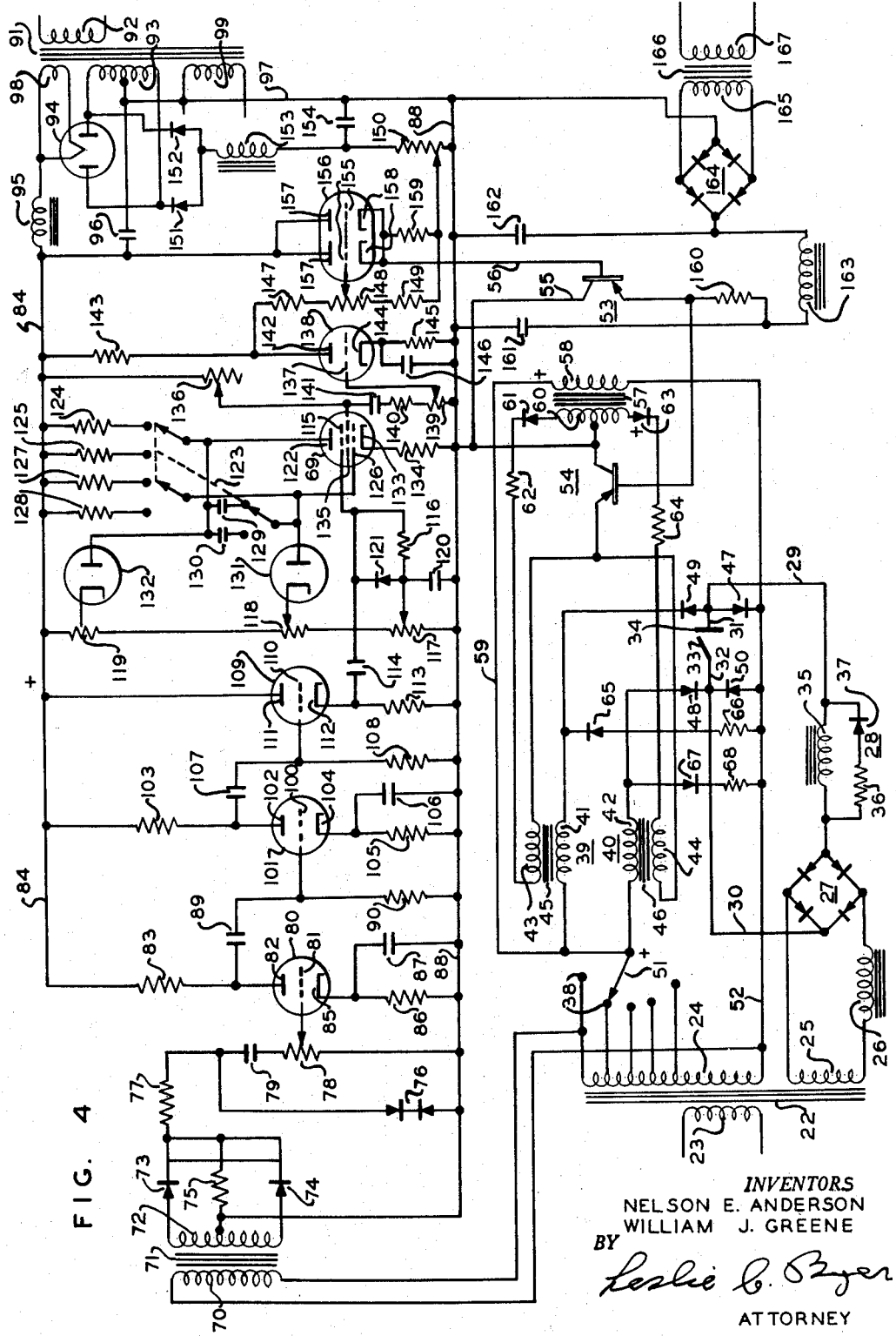
FIG. 4 shows in detail the interconnected circuits of the control components shown in the block diagram of FIG. 3.

FIG. 1 shows a typical wave-shape provided by operating the apparatus of FIG. 4 to produce 40 pulses of welding current flow per second from a sine wave alternating current source of supply. The cross-hatched areas 1 of each of the current pulses 2 illustrate the intervals when the crest values of arc current are in excess of the transition current 3, and when a spray transfer of weld metal is obtained from the electrode to the workpiece. During the remaining time no metal is released from the electrode although a drop may be forming on the tip of the electrode. The current pulses 2 are of like polarity and correspond to half cycles of a 60 cycle alternating current supply. The half cycle pulses of welding current are spaced from one another by a full cycle of the alternating current supply during which time the arc is maintained by the flow of a keep-alive direct current 4 of like polarity to current pulses 2 and of a nominal value of 25-50 amperes or even a lower range which in itself is insuffi-cient to cause any transfer of metal from the electrode to the workpiece. The effective level of current flow through the electrode is indicated at 5 and is the root mean square value of the current pulses added to the value of the keep-alive current. Under the conditions shown in FIG. 1 the keep-alive current has a substantially constant value of about 34 amperes, the effective level of welding current flow is about 84 amperes, and during each pulse of current flow there is an interval where the welding current exceeds the transition value of about 224 amperes and is consequently productive of an axial spray transfer of weld metal from the electrode to the workpiece. The welding conditions shown in FIG. 1 were determined by using a 0.045 inch diameter mild steel electrode, an arc length of ¼ inch with a ¾ inch stick-out of the electrode beyond its current contact, and an arc shielding atmosphere of argon containing 1% of oxygen.

Thus, in accordance with the invention current is supplied to the welding arc in the form of discrete pulses rather than continuously as in past practice when securing an axial spray transfer of weld metal. Preferably, the amplitude of the pulse currents is greater than the transition current at which spray transfer occurs while the root mean square and average current are less than this transition current. In FIG. 1 the effective or root mean square value of current has been shown. The average value would be slightly less than this. For a harmonic alternating current the root mean square value is .707 of the maximum while the average value is .635 of the maximum. The heat generated in the electrode stick-out due to its resistance depends on the root means square value of current flow therethrough while the heat generated in the arc depends on the average current flow therethrough and its anode and cathode drops.

By supplying pulse currents to the arc, metal is transferred as spray from the electrode to the workpiece only during these intervals when the current exceeds the transition value allowing the overall heating effect to be reduced for the purpose of achieving very low deposition rates and low energy inputs to the workpiece and the weld pool. As previously stated melting rate depends primarily on current flow and is influenced by the diameter and stick-out of the electrode and the resistivity of the electrode. Because current has a greater influence on the resistivity effect of melting rate, the change in melting rate is greater with steel electrodes than with aluminum electrodes when pulse power is used. Data are shown in Table I to demonstrate the reductions of melting rates that are possible while maintaining spray transfer with pulsed power.

*Table I*

| Wire and Operating Conditions | Continuous D.C. | | Pulse Power Supply | | | | | | | | | | | |
|---|---|---|---|---|---|---|---|---|---|---|---|---|---|---|
| | | | 60 pulses/second | | 40 | | 30 | | 24 | | 20 | | 15 | |
| | Transition Current | Melting Rates, lbs./hr. | $I_{rms}$ | M.R. | $I_{rms}$ | M.R. | $I_{rms}$ | M.R. | $I_{rms}$ | M.R. | $I_{rms}$ | M.R. | $I_{rms}$ | M.R. |
| .045" mild steel, ¼" arc length, ¾" stick-out | 220 | 7.26 | 115 | 1.93 | 82 | 1.44 | 70 | 1.19 | 68 | 1.00 | 60 | 1.00 | | |
| .062" mild steel, ¼" arc length, ¾" stick-out | | | | | 125 | 2.20 | 100 | 1.70 | 110 | 1.88 | 95 | 1.58 | 100 | 1.55 |
| .045" stainless steel (T316), ¼" arc length, ¾" stick-out | 160 | 7.16 | | | 75 | 1.46 | | | 65 | 1.00 | | | | |
| .062" magnesium (Mg-7), ¼" arc length, ¼" stick-out | 180 | 2.41 | | | 105 | 0.93 | | | 70 | 0.69 | | | | |
| .047" aluminum (43S), ¼" arc length, ¼" stick-out | 140 | 2.10 | | | 95 | 0.92 | | | 75 | 0.60 | | | | |

Pulsed power is of particular importance when welding thinner sections than currently possible with a continuous supply of spray producing welding current. It is also of great value in out-of-position welding and in particular when welding metals with poor thermal conductivity such as stainless steels, high strength steels, Monel and the like. Thus, in a shielding gas of argon containing 1% oxygen, an overhead fillet weld was made in 1/16 inch stainless steel sheet with a .035 inch diameter stainless steel electrode by using arc current at 40 pulses per second and having an effective value of 160 amperes. The electrode feeding rate was 131 inches per minute. Also, in a shielding gas of argon containing 1% oxygen, a vertical fillet weld was made in 1/16 inch stainless steel with a .035 inch diameter stainless steel electrode by using arc current at 24 pulses per second and having an effective value of 90 amperes. In this case the electrode feeding rate was 82 inches per minute. Also, in a shielding gas of argon containing 1% oxygen, a square butt weld in 1/16 inch stainless steel sheet was made with a .062 inch diameter stainless steel electrode by using arc current at 40 pulses per second and having an effective value of 135 amperes. In this case the electrode feeding rate was 50 inches per minute.

In order to study the drop formation process with pulsed power, slow motion pictures at 4000 frames per second were taken using a .045 inch diameter mild steel electrode when welding in a shielding atmosphere of argon containing 1% oxygen. The pulse rates of 15, 24, 30 and 40 per second were found to have the same transfer mechanism. At least one spray drop is transferred per pulse at transition if the peak current is high enough or more precisely if the current waveform is of the proper shape. This influence of current waveform is attributed to a critical integrated current-time factor required to form and transfer a drop. Study of the films indicated that the formation and release of a drop occurs in about .002 second. At high current levels of crest current values more than one drop is created and transferred, the same number generally occurring for a given material and the same operating conditions. The spray transfer of metal appears to be synchronous with the current pulses with one drop associated with each pulse. However, under one set of operating conditions when using 15 double pulses per second, that is, two consecutive ½ cycles of a 60 cycle current flow per second, the first pulse of the pair transferred a spray drop of metal while the second pulse did not have quite enough force to cause transfer of another drop. The second formed drop necked down but still was attached to the electrode by a small column of liquid metal and when the current pulse was over, the drop snapped back as though it was attached by a rubber strand. It is possible that the force that moved the drop back was due to the surface tension of the molten metal.

As is quite obvious, many forms of apparatus may be employed for supplying pulsed power to a welding arc in accordance with the invention. One such apparatus has been shown in FIGS. 3 and 4. FIG. 4 is a wiring diagram of the apparatus and FIG. 3 is a block diagram showing the relationship between the salient components thereof.

As shown in FIG. 3, current is supplied to a welding arc established between an electrode 6 and a workpiece 7 connected in a welding circuit 8, 9 by a power transformer 10, which is energized through conductors 11 from a 460 volt single phase sine wave 60 cycle alternating current source of supply. Keep-alive current, which by itself may cause fusion of the electrode but which is insufficient to cause any transfer of fused electrode metal to the workpiece, is supplied to the welding arc by component 12 of the system which is energized by the power transformer 10 through conductors 13. This keep-alive current is supplied by component 12 to the welding circuit 8, 9 through conductors 14 and 15 which are connected thereto. An axial spray transfer of weld metal from the electrode to the workpiece is obtained by supplying pulses of current to the welding circuit conductors and the welding arc from the power transformer 10 through a full wave power reactor component 16 connected in series with a full wave rectifier component 17. The power reactor 16 is a magnetic amplifier whose conductivity is controlled by the output of a transistor current amplifier component 18 which is energized by a 115 volt 60 cycle alternating current single phase sine wave source of supply 19 and controlled by an electronic pulse generator component 20 also energized from this same source of supply. The electric control pulses of the electronic pulse generator 20 are synchronized with the output voltage of the power transformer 10 by a connection 21 therewith as illustrated.

The system thus comprises means for supplying keep-alive direct current to a welding circuit in an amount to maintain an arc between the fusible electrode 6 and a workpiece 7 connected in the welding circuit 8, 9 without causing a transfer of fused electrode metal to the workpiece, and means for also supplying to the welding circuit and the arc spaced pulses of current of a polarity corresponding to the polarity of this keep-alive direct current supply means and of a magnitude, when added to the current supplied by the keep-alive supply means, to produce fusion of the electrode at current densities sufficient to cause a spray transfer of metal from the electrode to the workpiece. The current pulses are supplied during half cycles of the alternating current supply and are spaced from one another by a predetermined number of half cycles of this supply in accordance with the switching action provided by the power reactor as it is controlled through the transistor current amplifier by the electronic pulse generator whose action is synchronized with the voltage of the alternating current supply.

As shown in greater detail in FIG. 4 where the components of FIG. 3 are identified by additional reference numbers, the constant voltage power transformer 22 is provided with a primary winding 23 and two secondary windings 24 and 25. The secondary winding 25 of this power transformer supplies keep-alive current to the welding arc. It is connected through a current limiting series reactor 26 to the input terminals of a full wave rectifier bridge 27 whose output terminals are connected through a smoothing circuit 28 and conductors 29 and 30 to the welding circuit conductors 31 and 32 in which the electrode 33 and workpiece 34 are connected in series with one another. The smoothing circuit 28 is provided to reduce the output ripple of the rectifier 27 to a satisfactory value and comprises a reactor 35 shunted by a series connected resistor 36 and rectifier 37 which is poled to discharge reactor 35.

The secondary winding 24 of the constant voltage transformer 22 is provided with taps 38 for use in varying the magnitude of the current pulses supplied to the welding arc through a magnetic amplifier and a rectifier bridge connected in series with one another and the welding circuit 31, 32 across the output terminals of this secondary winding. The magnetic amplifier consists of a pair of selfsaturating reactors 39 and 40, each having respectively a load circuit coil 41 and 42 and a flux resetting winding 43 and 44 encircling cores 45 and 46 of a magnetic material having substantially rectangular hysteresis loop characteristics. As will be apparent from further description below, the energization of the reset windings 43 and 44 of reactors 39 and 40 are suitably controlled to select the particular half cycles of the alternating current supply in which each reactor will conduct. The load circuit coils 41 and 42 of these reactors 39 and 40 are respectively connected in circuit with a different one of the alternately conducting adjacent arms of the rectifier bridge comprising rectifiers 47, 48, 49, 50. The reactor 40 may be considered as controlling the supply of positive half cycles of the alternating current to the welding arc and the reactor 39 as controlling the supply of negative half cycles of the supply to the welding arc. The rectifier bridge 47, 48, 49, 50 supplies these positive and negative half cycles of alternating current at the same polarity to the arc as the voltage supplied thereto by the keep-alive circuit above described. The welding arc and the welding circuit conductors 31, 32 are connected across the output terminals of this rectifier bridge. The reactors and bridge circuit through which current pulses are supplied to the arc may be considered as a unit which constitutes a full wave magnetic amplifier bridge connected between the alternating current supply conductors 51 and 52 and the welding circuit conductors 31, 32. Alternating current conductor 51 is connected through a tap switch as indicated to one of the taps 38 at one end of the secondary winding 24 of the power transformer 22 and conductor 52 is connected to the terminal at the other end of this winding.

Reactors 39 and 40 are of the selfsaturating type. When half cycle current flows through their load circuit coils 41 and 42, the cores 45 and 46 thereof are driven into positive saturation. During the next half cycle their reset windings 43 and 44 drive the flux in the reactor cores out of positive saturation down to a flux level determined by the reset voltage-time integral. This level of flux in the cores then determines the amount of voltage-time integral that will be absorbed in the next half cycle when current flows through the load circuit coils of these reactors. When the reactors cannot absorb any further increase in volt-seconds they become saturated thereby presenting a low series impedance that permits maximum current to flow through the load circuit coil. By the proper choice of the reset volt-seconds the conduction of the reactor may take place at any angle during the 180 electrical degrees of the voltage applied thereto. In this respect the action is similar to that of a thyratron gas tube.

To obtain this switching action, the iron cores of the reactors should have a substantially rectangular shaped hysteresis loop characteristic such as obtained by using certain nickel-iron alloys. However, by using a reactor core of large cross-section area made from an uncut tape of grain oriented silicon steel, satisfactory results may be obtained at much less cost although this cheaper core material does not switch as fast and does round the pulse somewhat.

Current flow through the reset windings 43 and 44 of reactors 39 and 40 is controlled by a transistor current amplifier consisting of transistors 53 and 54. The conductivity of transistor 53 is controlled by an input supplied thereto through conductors 55 and 56 from an electric pulse generator which is shown at the top of the drawing and which will be described below. This transistor 53 in turn controls the conductivity of transistor 54 which is in a circuit common to both of the reset windings 43 and 44 of reactors 39 and 40. Current is supplied to these windings through a reset voltage transformer 57 having a primary winding 58 connected to the secondary winding 24 of transformer 22 through conductor 52 and conductors 59 and 51. One end terminal of secondary winding 60 of reset voltage transformer 57 is connected through a rectifier 61 and a current limiting resistor 62 in circuit with the reset winding 43 and transistor 54 to a midtap of this secondary winding and the other end terminal of this winding 60 is connected through a rectifier 63 and a current limiting resistor 64 in circuit with the reset winding 44 and transistor 54 to the same midtap of this winding. Rectifier 61 is suitably poled so that current can flow through winding 43 when current flow through load circuit winding 41 is blocked by rectifiers 49 and 50 of the load circuit rectifier bridge, and rectifier 63 is poled so that current can flow through reset winding 44 when current flow through the load circuit coil 42 of reactor 40 is blocked by rectifiers 47 and 48 of the load circuit rectifier bridge. Thus, during the nonconducting periods of reactors 39 and 40 the flux in their cores may be reset by a controlled current flow through their reset windings 43 and 44 respectively associated with these reactors.

When the welding circuit is open, no current can flow through the load circuit coils 41 and 42 of reactors 39 and 40. Consequently, reset windings 43 and 44 by repeated excitation may build up the flux in cores 45 and 46 of these reactors to saturation and this would cause excessive current to flow in the reset winding circuits which would damage the transistors 53 and 54. In order to prevent this, each load circuit coil is provided with its own flux setting circuit so that current may flow through the load circuit coil to set the flux therein after each period of flux resetting occasioned by energization of reset windings 43 and 44. The flux setting circuit for reactor 39 comprises rectifier 65 and current limiting resistor 66 connected in series circuit with one another and the load circuit coil 41 of reactor 39 across the alternating current input terminals of the power rectifier bridge, and the flux setting circuit for reactor 40 comprises a rectifier 67 and a current limiting resistor 68 connected in series circuit with one another and the load circuit coil 42 of this reactor across the alternating current input terminals of the power rectifier bridge. In each case the rectifiers 65 and 67 are poled to pass current through its associated load circuit coil in the same direction as current flows therethrough due to its connection in the power rectifier bridge circuit. Thus, irrespective of whether the welding circuit is open or closed, after each energization of a reset winding to reset the flux in the core of a reactor there is a current flow through its load circuit coil in a direction to set the flux therein.

The electronic pulse generator shown at the top of FIG. 4 comprises a cathode coupled phantastron whose pentode is shown at 69 with circuits to the left thereof for synchronizing its operation with the voltage of the secondary winding 24 of power transformer 22 and circuits to the right thereof by which the rectangular control voltage of its screen grid is employed for applying a control voltage between the base and collector of transistor 53 in order to control its conductivity and consequently control the energization of the reset windings 43 and 44 of reactors 39 and 40 through transistor 54. The phantastron is a relaxation oscillator that generates a linear timing wave by means of the so-called "Miller sweep generator." Its rectangular output voltage is a linear function of its input control voltage and it is used because of the accuracy of the linear timing made possible thereby.

The synchronizing voltage for the phantastron is obtained by connecting the primary winding 70 of a transformer 71 across the end terminals of the secondary winding 24 of power transformer 22. The secondary winding 72 of transformer 71 has end terminals connected through rectifiers 73 and 74 to one terminal of a load resistor 75 whose other terminal is connected to the midtap of winding 72. Consequently, half cycles of like polarity of the alternating current appear across the load resistor 75 and are applied across the Zener diode 76 which is connected in series with a resistor 77 across this resistor. A resistor 78 and a capacitor 79 constituting a differentiating circuit for controlling the energization of triode 80 is connected in shunt to Zener diode 76 which is rated at 5 volts and the differentiating circuit is consequently sensitive to the steep part of the half waves of rectified voltage appearing across load resistor 75. A control voltage for the grid 81 of triode 80 is obtained through a slider making contact with resistor 78. The anode 82 of triode 80 is connected through an anode resistor 83 to a conductor 84 and the cathode 85 of triode 80 is connected through a cathode resistor 86 and a capacitor 87 in shunt thereto to a conductor 88. The output of triode 80 is connected through another differentiating circuit including a capacitor 89 and a resistor 90 connected in series with one another and between the anode 82 of triode 80 and conductor 88.

Conductor 84 constitutes a source of positive voltage relative to conductor 88 and these conductors 84 and 88 are respectively connected to the positive and negative terminals of a full wave rectifier shown at the upper right hand corner of FIGURE 4 of the drawings. This rectifier is energized by a transformer 91 having a primary winding 92 connected to an alternating current source of supply and a first secondary winding 93 connected through a full wave rectifier tube 94 and a filter circuit including reactor 95 and capacitor 96 to conductor 84 and through conductor 97 to conductor 88. Heating current is supplied to the cathode of rectifier tube 94 by a second secondary winding 98 of transformer 91 and cathode heating current is supplied to triode 80 and the other tubes about to be described by a third secondary winding 99 of transformer 91. The third secondary winding is connected to the center tap of the first secondary winding 93 of the transformer 91.

The grid 100 of a triode 101 is connected between the capacitor 89 and resistor 90 to be sensitive to the output of triode 80. The anode 102 of triode 80 is connected through an anode resistor 103 to the positive conductor 84 and its cathode 104 is connected through a resistor 105 and a capacitor 106 in shunt thereto to the negative conductor 88. The output circuit of triode 101 is connected from its anode 102 through capacitor 107 and resistor 108 to conductor 88. The connections of triode 101 provide a high gain amplifier for controlling the energization of a cathode follower circuit embodying triode 109 whose grid 110 is connected between the capacitor 107 and resistor 108 in the output circuit of triode 101. The anode 111 of triode 109 is connected to the positive conductor 84 and its cathode 112 is connected through cathode resistor 113 to the negative conductor 88.

The output of this cathode follower circuit is supplied through a coupling capacitor 114 to the suppressor grid 115 of pentode 69 of the phantastron. A bias voltage is applied to suppressor grid 115 through a resistor 116 and a slider making contact with a resistor 117 forming a part of a voltage divider comprising this resistor and resistors 118 and 119 connected in series circuit with one another across conductors 84 and 88. A capacitor 120 is connected across the lower portion of resistor 117 and a rectifier 121 is provided for shunting negative control impulses from the suppressor grid 115 of pentode 69. The anode 122 of pentode 69 is connected in accordance with the position of a switch 123 through resistor 124 or resistor 125 to conductor 84. The control grid 126 of pentode 69 is connected in accordance with the position of switch 123 through resistor 127 or resistor 128 to conductor 84. Timing capacitors 129 and 130, depending upon the position of switch 123, are charged through the anode resistors of pentode 69 to a voltage determined by the diode 131 whose cathode is connected through a slider to resistor 118 of the voltage divider 117, 118, 119. During "run down" of the phantastron the anode voltage of pentode 69 is limited by another diode 132 whose cathode is connected through a slider to resistor 119 of the voltage divider 117, 118, 119. The cathode 133 of pentode 69 is connected through a resistor 134 to conductor 88. The screen grid 135 of pentode 69 is connected through an adjustable resistor 136 to conductor 84.

By operating switch 123 capacitors 129 and 130 of different values may be connected in different charging and discharging circuits of the phantastron and the amount of voltage to which these capacitors are charged and the limit of run down voltage of the phantastron are respectively controlled by an adjustment of the sliders on resistors 118 and 119 of the voltage divider 117, 118, 119. When the phantastron is triggered by the voltage supplied to its suppressor grid, its run down time is initiated and will continue depending on the adjustments just referred to. At the time of triggering, the screen grid voltage of pentode 69 will abruptly rise and it will abruptly fall at the end of the timing period. The rectangular wave of voltage thus obtained is used for controlling the energization of the reset windings 43 and 44 of the reactors 39 and 40 in the manner about to be described.

The rectangular output voltage wave at the screen grid 135 of the phantastron circuit is applied to the grid 137 of triode 138 through a slider contacting a resistor 139 series connected with a resistor 140 and a coupling capacitor 141 between the screen grid of pentode 69 and conductor 88. The anode 142 of triode 138 is connected through an anode resistor 143 to conductor 84 and its cathode 144 is connected through a resistor 145, shunted by a capacitor 146, to conductor 88. The output circuit of triode 138 is connected between its anode 142 and conductor 88 through series connected resistors 147, 148, 149 and the voltage across the lower portion of a potentiometer 150. The positive terminal of potentiometer 150 is connected to the positive terminal of a full wave rectifier circuit through conductors 88 and 97 and its other terminal is connected to the negative terminal of this rectifier circuit which is energized by the secondary winding 93 of transformer 91 and includes rectifiers 151 and 152 and a filter formed by a reactor 153 and a capacitor 154.

The rectangular wave output appearing at the screen grid of pentode 69 during anode conduction of the phantastron is applied to the control grids 155 of the double triode 156 through their slider connection with resistor 148 in the output circuit of triode 138. The anodes 157 of double triode 156 are connected to the positive conductor 84 and its cathodes 158 are connected through a cathode resistor 159 to the slider connection on potentiometer 150. Consequently, the rectangular wave positive value of voltage at the screen grid of pentode 69 of the phantastron is amplified and inverted by the circuit of triode 138 and applied to the control grids 155 of double triode 156 to decrease the conduction thereof and reduce the voltage drop across resistor 159 by an amount which applies between the base and collector of transistor 53 a voltage which renders transistor 53 conducting which in turn renders transistor 54 conducting and consequently provides excitation for the reset windings 43 and 44 of reactors 39 and 40. This prohibits conduction of current through the load circuit coils 41 and 42 of reactors 39 and 40 and consequently blocks the supply of pulsed welding current to the welding arc. At the end of the time period when the rectangular voltage output wave at the screen grid of pentode 69 of the phantastron decreases, the reverse operation occurs and the transistors 53 and 54 are rendered non-conducting so that reactors 39 and 40 become conducting during the next half cycle of applied voltage to supply a pulse of current during the next half cycle of voltage applied to these reactors. If these reactors are not reset they have a low impedance and consequently pass current to the welding circuit and the welding arc.

A supply of direct current voltage is applied between the emitter and collector of transistor 53 by a full wave rectifier whose positive output terminal is connected through a current limiting resistor 160 to the transistor emitter and whose negative terminal is connected through conductors 55 and 88 to the collector thereof. This direct current is supplied through a filter comprising capacitors 161 and 162 and a reactor 163 connected in the output circuit of a full wave rectifier bridge 164 whose input circuit is connected to the secondary winding 165 of a transformer 166 having a primary winding 167 connected to an alternating current source of supply. If, for transistor 54, one is used which will cut off with a floating base, then the voltage supply described above is unnecessary and may be omitted.

In view of the above description of the various elements of the system shown in FIG. 4 and the functional operation of these elements and their action on one another it is believed that the overall operation of the system is quite apparent. In summary, spikes of voltage synchronized with the alternating current of the secondary winding 24 of power transformer 22 are obtained in the differentiating circuit 78, 79 connected across the Zener diode 76 and these spikes of voltage are amplified by the circuit of triode 80 to appear across a second differentiating circuit 89, 90 and applied to the high gain amplifier circuit of triode 101 which acts on the cathode follower circuit of triode 109 to apply control voltages to the suppressor grid 115 of the pentode 69 of the phantastron, and the phantastron is thus placed in timing operation. The voltage of its screen grid abruptly rises while the capacitor 129 or 130 connected in its anode circuit is being discharged linearly. When the phantastron has run down, the voltage at the screen grid 135 abruptly falls and stays at a lower level until the phantastron is again tripped into timing operation for the next run down period. The rectangular wave output of the phantastron is then amplified and inverted by the circuit of triode 138 which controls the cathode follower circuit of triode 156 to produce control voltages across resistor 159. When sufficient current is flowing through triode 156 the magnitude of the positive voltage appearing across resistor 159 is sufficient to render transistor 53 non-conducting which in turn renders transistor 54 non-conducting to interrupt the flow of current through the reset windings 43 and 44 of reactors 39 and 40 of the magnetic amplifier. When the reset windings are thus deenergized the magnetic amplifier passes alternating current which is rectified by the rectifier circuit connected in series therewith to supply pulse current to the welding arc. When the reset windings 43 and 44 of reactors 39 and 40 are energized, the flux in these reactors is reset so that the magnetic amplifier embodying these reactors is non-conducting and no current flows to the welding arc during which time the arc is maintained by the keep-alive current supplied through rectifier 27. The amount of current supplied through the magnetic amplifier in addition to the current supplied through the keep-alive circuit is sufficient in magnitude to produce an axial spray transfer of metal from the electrode to the workpiece during the crest values of the pulsed current supplied through the magnetic amplifier.

By adjusting the timing operation of the phantastron, current is supplied through the magnetic amplifier during half cycle periods of the alternating current supply which are separated from one another in time of occurrence by one or more half cycles of this supply. For example, if the adjustment is such that full half cycles of current flow occur with a separation of one complete cycle of the alternating current supply, the resulting operation is represented in the diagram of FIG. 2. In this figure, the half cycles of current flow have been shaded and when a half cycle corresponds to an alternating current half cycle of current the outline of the wave is shown by a solid line whereas when a half cycle of alternating current has been rectified its outline is shown by a broken line. Thus, to begin with, a half cycle of the alternating current is supplied to the load circuit coil 42 of reactor 40 and rectifiers 48 and 47 while at the same time the flux in reactor 39 is being reset as indicated in FIG. 2 by the R placed under this half cycle of current flow. During the next half cycle, due to the resetting of the flux in reactor 39 no current flows through its load circuit coil 41 and during this time the flux in reactor 40 is being reset as indicated by the letter R associated with this half cycle in the diagram. During the next half cycle no current flows through the load circuit coil 42 of reactor 40 because of the reset flux therein but at this time the reset winding 43 of reactor 39 is deenergized so that its flux is not reset as indicated by the letters NR associated with this half cycle in the diagram of FIG. 2. Consequently, during the next half cycle reactor 39 is conducting and the negative half cycle of voltage is rectified by the rectifiers 50 and 49 to pass the second pulse of current to the arc at a time one full cycle later than the time of application of the first pulse of alternating current to the arc. Thereafter the operation is repeated producing a pattern of current flow as indicated in FIG. 2 of the drawings.

As previously stated the pattern of pulsed current flow can be adjusted by an adjustment of the phantastron timer to produce electric pulses of control current which control the switching operations of transistors 53 and 54 to control the energization and deenergization of the reset windings 43 and 44 of reactors 39 and 40 and control the conductivity and non-conductivity of the magnetic amplifier embodying these reactors. The most desirable operation of the system is an adjustment thereof which produces a pulsed current flow wherein the wave form is symmetrical about the zero axis of the alternating current. This prevents a direct current component of current flow in the secondary winding of the power transformer which would produce saturation in the transformer and cause heavy line current pulses to flow which would cause undesirable heating of the transformer.

With the system just described pulse rates of 24 and 40 are the most desirable. A pulse rate of 15 per second produces a flicker in the arc which may be annoying to an operator performing manual welding and a pulse rate of 60 or 120 may not be sufficiently productive of the desired reduction in high melting rate and high energy input to the workpiece and the weld pool to warrant their use for most welding operations. Aside from limitations imposed for the most desirable operation of the system just described, it is to be understood, however, that the benefits of the invention are obtained when the pulse rate is within the range of 15 to 120 per second and that the preferable operating range appears to be from 24 to 40 pulses per second when using a wire .035 inch in diameter.

The invention is particularly applicable to welding thin sections and to out-of-position welding, particularly on those materials with poor thermal conductivity such as stainless steels, high strength steels, and Monel. The advantages of lower heat input to the workpiece and the weld pool with this method of welding also extend to the welding of aluminum and of magnesium. The refractory oxide skin on electrode wires of magnesium makes it difficult to supply the high values of welding current thereto at the wire feed rates required for axial spray deposit with continuous direct current and the use of pulsed power provides a solution to this difficulty in reducing both the current and the electrode feed rate. The invention is not, however, limited to welding thin sections but is applicable wherever it is desired to obtain an axial spray transfer of metal at a low average current value to prevent excessive heating of the workpiece or of the pool of molten weld metal. Another advantage is in the use of larger diameter electrodes at effective low current levels to permit cost reduction and the elimination of electrode wire feeding difficulties which exist when using small diameter electrodes especially where the electrode is made of a soft metal such as aluminum or magnesium.

It is quite obvious that the wave shape of the pulsed currents may be variously modified and that the invention is not limited to welding with full half cycles of alternating current as above described when considering one operation of the circuit of FIG. 4.

As previously stated axial spray transfer of electrode metal may be obtained if the crest values of the current pulses are high enough or more precisely if the current wave form is of the proper shape. This influence of current wave form is attributed to a critical integrated current-time function required to form and transfer a spray forming drop of metal. Other arrangements of apparatus than that illustrated and described may be employed for accomplishing the desired result of obtaining axial spray transfer of electrode metal at lower values of effective and average current in order to reduce the high melting rate of the electrode and the high energy input to the workpiece and the weld pool.

Thus, while the invention has been above described as being performed by the apparatus described it is apparent that this apparatus may be variously modified and that other forms of apparatus may be employed for producing the pulsed current flow used in practicing the invention. Other substitute arrangements will occur to those skilled in the art in view of the above description of this invention and it is, therefore, intended that the appended

What is claimed is:

1. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average welding current values which comprises supplying through said electrode to the welding arc pulses of current which are spaced from one another in time of occurrence and which have crest values greater than said transition value of current.

2. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average welding current values which comprises supplying through said electrode to the welding arc current pulses which have crest values greater than said transition value of current and which produce only during their occurrence the release of spray producing drops of metal from said electrode.

3. In metal arc welding wherein an axial spray transfer of metal from a consumable electrode to a workpiece occurs when the current density in the electrode exceeds a predetermined value, the method of reducing the melting rate of said electrode and the energy input to the workpiece which comprises supplying through said electrode to the arc spray producing values of welding current during a part only of its total operating time, the current supplied to said arc during the remaining part of its operating time being sufficient to maintain said arc without causing a transfer of metal from said electrode to the workpiece.

4. The method of arc welding in which an arc between a consumable electrode and a workpiece is maintained by supplying through said electrode a keep-alive current flow which in itself is insufficient to produce a transfer of metal from said electrode to the workpiece and in which current pulses are superimposed on said keep-alive current flow to obtain periodic values of current flow through said electrode which are sufficient to produce an axial spray transfer of molten metal from said electrode to the workpiece at a rate commensurate with the desired melting rate of said electrode and the desired heat input to the workpiece.

5. In arc welding with an arc maintained between a consumable electrode and a workpiece, the method of reducing the melting rate of said electrode which comprises energizing the arc with a current flow through said electrode which is sufficient to maintain the arc without transferring metal from said electrode to the workpiece, and supplying to said arc through said electrode spaced periods of current flow which in combination with said arc maintaining current flow will produce an axial spray type of metal transfer from said electrode to the workpiece.

6. The method of securing an axial spray transfer of weld metal through a welding arc from a consumable electrode to a workpiece for only a fraction of the total operating time of said arc, said method comprising maintaining said arc by a current flow through said electrode which in itself is insufficient to produce a transfer of molten metal from said electrode to the workpiece, and producing a spray transfer of molten metal from said electrode to the workpiece by supplying through said electrode to said arc discrete pulses of current flow which are of sufficient magnitude when added to said arc maintaining current flow to produce said spray transfer of metal from said electrode to the workpiece during the occurrence of said pulses.

7. The method of arc welding in which an arc between a consumable electrode and a workpiece is maintained by supplying through said electrode a keep-alive current flow which in itself is insufficient to produce a transfer of metal from said electrode to the workpiece and in which current pulses are superimposed on said keep-alive current flow to obtain resultant values of current flow through said electrode which are sufficient to produce a transfer of molten metal from said electrode to the workpiece only during the occurrence of said current pulses.

8. In arc welding, the method of reducing the melting rate of a consumable electrode and the energy input to the workpiece which comprises supplying through said electrode to the welding arc recurrent values of welding current which during their occurrence produce a transfer of molten metal from said electrode to the workpiece and between the periods of metal transfer produced by said recurrent values of welding current supplying said arc with a current sufficient to maintain the arc without causing a transfer of metal from said electrode to the workpiece.

9. In arc welding, the method of reducing the melting rate of a consumable electrode and the energy input to the workpiece which comprises supplying through said electrode to the welding arc recurrent values of welding current which occur at a frequency of from 24 to 40 per second and which during their occurrence produce a transfer of molten metal from said electrode to the workpiece and between the periods of metal transfer produced by said recurrent values of welding current supplying said arc with a current sufficient to maintain the arc without causing a transfer of metal from said electrode to the workpiece.

10. A method of arc welding with a consumable electrode which comprises supplying a welding arc with a current flow through said electrode that will maintain the arc and cause fusion of said electrode without causing a transfer of molten metal from said electrode to the workpiece and superimposing on said arc maintaining current discrete pulses of current which in combination with said arc maintaining current are sufficient to cause during their occurrence a transfer of molten metal from said electrode to the workpiece in globules insufficient in size to short-circuit the arc during their passage therethrough.

11. A method of arc welding with a consumable electrode which comprises supplying a welding arc with a current flow through said electrode that will maintain the arc without causing a transfer of molten metal from said electrode to the workpiece and superimposing on said arc maintaining current discrete pulses of current which in combination with said arm maintaining current are sufficient to cause during their occurrence a transfer of molten metal from said electrode to the workpiece in globules insufficient in size to short-circuit the arc during their passage therethrough.

12. In metal arc welding in a shielding gas atmosphere wherein an axial spray transfer of metal from a consumable electrode to a workpiece occurs when the continuous direct current supplied to the welding arc through said electrode exceeds a predetermined value, the method of reducing the melting rate of said electrode and the energy input to the workpiece which comprises maintaining the welding arc by a direct current flow through said electrode which in itself is insufficient to cause a transfer of metal from said electrode to the workpiece, and supplying to the welding arc through said electrode unidirectional current pulses which are spaced in time from one another and which are of the same polarity as said arc maintaining current, in combination with which they produce crest values of welding current flow which are of greater magnitude than said predetermined value of continuous direct current.

13. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average values of welding current flow which comprises maintaining the welding arc by a current flow through said electrode which in itself is insufficient to cause a transfer of metal from said electrode to the workpiece, and supplying additional current through said electrode to the welding arc in pulses which produce crest values of welding current flow which are greater than said transition value of current and which are spaced from one another in time of occurrence.

14. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average values of welding current flow which comprises maintaining the welding arc by a current flow through said electrode which in itself is insufficient to cause a transfer of metal from said electrode to the workpiece, and supplying additional current through said electrode to the welding arc in pulses which are spaced from one another in time of occurrence and which in combination with said arc maintaining current produces a pulsating welding current flow having crest values greater than said transition value of current.

15. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average values of welding current flow which comprises maintaining the welding arc by a current flow through said electrode which in itself is insufficient to cause a transfer of metal from said electrode to the workpiece, and supplying through said electrode to the welding arc discrete current pulses which in combination with said arc maintaining current produce crest values of welding current flow that are greater than said transition value of current and which produce only during the occurrence of said pulses the release of a spray producing drop of metal from said electrode.

16. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average welding current values which comprises maintaining the welding arc in continuous operation by supplying thereto through said electrode a current flow which is insufficient to cause a transfer of metal from said electrode to the workpiece, and concurrently energizing the welding arc from a single phase alternating current source of supply to secure during half cycles thereof current flow through said electrode in pulses of like polarity which are spaced from one another and combine with said arc maintaining current flow to form periodically crest values of arc welding current flow that are greater in value than said transition value of current.

17. In the practice of high current density arc welding wherein at welding current values above a transition value the molten drops of metal released from a consumable metal electrode suddenly increase in number with a concurrent reduction in their size to produce an axial spray transfer of metal from the electrode to a workpiece, the method of obtaining the characteristics of said high current density arc welding at low average welding current values which comprises maintaining the welding arc in continuous operation by supplying thereto through said electrode a direct current flow which is insufficient to cause a transfer of metal from said electrode to the workpiece, and concurrently energizing the welding arc from a single phase alternating current source of supply to secure during half cycles thereof current flow through said electrode in pulses which are of like polarity to that supplied to the welding arc by said direct current flow of arc maintaining current and which are spaced from one another by a whole number of cycles of said alternating current supply and combine with said arc maintaining current flow to form periodically crest values of arc welding current flow that are greater in value than said transition value of current.

18. Arc welding apparatus comprising means for supplying direct current to a welding circuit in an amount sufficient to maintain an arc between a fusible electrode and a workpiece connected therein without causing a transfer of metal from said electrode to the workpiece, and means for also supplying to said arc spaced pulses of current of a polarity corresponding to the polarity of said direct current supply means and of a magnitude when added to the current supplied by said direct current supply means to produce during their occurrence current flow through said electrode at densities sufficient to cause a spray transfer of metal from said electrode to the workpiece.

19. Arc welding apparatus comprising alternating current supply conductors, a welding circuit having terminals respectively connectable to a fusible electrode and to a workpiece, means for supplying direct current to said welding circuit in an amount sufficient to maintain an arc between a fusible electrode and a workpiece connected therein without causing a transfer of metal from said electrode to the workpiece, means including a full wave magnetic amplifier rectifier bridge connected between said alternating current supply conductors and said welding circuit for supplying to said welding circuit additional direct current of the same polarity as is supplied thereto by said direct current supply means and of a magnitude sufficient when added to the current supplied by said direct current supply means to produce current flow through said electrode connected in said welding circuit at current densities producing a spray transfer of metal from said electrode to the workpiece, and means controlling the conductivity of the magnetic amplifier portion of said rectifier bridge for supplying spaced pulses of electrode fusing current to said welding circuit.

20. Arc welding apparatus comprising alternating current supply conductors, a welding circuit having terminals respectively connectable to a fusible electrode and to a workpiece, means for supplying direct current to said welding circuit in an amount to maintain an arc between a fusible electrode and a workpiece connected therein without causing a transfer of metal from said electrode to the workpiece, means including a full wave magnetic amplifier rectifier bridge connected between said alternating current supply conductors and said welding circuit for supply to said welding circuit additional direct current of the same polarity as is supplied thereto by said direct current supply means and of a magnitude sufficient when added to the current supplied by said direct current supply means to produce current flow through said electrode connected in said welding circuit at current densities producing a spray transfer of metal from said electrode to the workpiece also connected in said welding circuit, and means synchronized with the alternating current of said alternating current supply conductors for controlling the conductivity of the magnetic amplifier portion of said rectifier bridge to produce current flow from said alternating current supply conductors to said welding circuit during half cycle periods thereof which are spaced from one another in time by a predetermined number of half cycle periods thereof.

21. Arc welding apparatus comprising alternating current supply conductors, a welding circuit, a full wave rectifier bridge having alternating current input terminals connected to said alternating current supply conductors and direct current output terminals connected to said welding circuit, a pair of selfsaturating reactors each having a load circuit coil and a flux resetting winding encircling a core of magnetic material with a substantially rectangular hysteresis loop characteristic and each having its load circuit coil connected in a different one of the alternately conducting adjacent arms of said rectifier bridge, a flux setting circuit for each of said reactors comprising a resistor and a rectifier connected in series circuit with one another and the load circuit coil of its respective reactor across said input terminals of said rectifier bridge, each of said rectifiers being poled to pass current through its associated reactor load circuit coil in the same direction as current flows therethrough due to its connection in said rectifier bridge circuit when said welding circuit is closed, and means for energizing during spaced predetermined periods of time said reset windings of said saturable reactors after each flux setting period of current flow in said load circuit coils of said saturable reactors to prevent current flow through said rectifier bridge to said welding circuit and for de-energizing at least one of said reset windings during the time intervals between said spaced periods of time to permit a pulse of current to flow through said rectifier bridge to said welding circuit.

22. Arc welding apparatus comprising alternating current supply conductors, a welding circuit, a full wave rectifier bridge having alternating current input terminals connected to said alternating current supply conductors and direct current output terminals connected to said welding circuit, a pair of selfsaturating reactors each having a load circuit coil and a flux resetting winding encircling a core of magnetic material with a substantially rectangular hysteresis loop characteristic and each having its load circuit coil connected in a different one of the alternately conducting adjacent arms of said rectifier bridge, a flux setting circuit for each of said reactors comprising a resistor and a rectifier connected in series circuit with one another and the load circuit coil of its respective reactor across said input terminals of said rectifier bridge, each of said rectifiers being poled to pass current through its associated reactor load circuit coil in the same direction as current flows therethrough due to its connection in said rectifier bridge circuit when said welding circuit is closed, means synchronized with the alternating current of said alternating current supply conductors for generating electrical pulses of predetermined duration and spacing from one another, and means actuated by said spaced electrical pulses for controlling the energization of said reset windings of said saturable reactors to produce pulses of welding current flow through said rectifier bridge to said welding circuit.

23. Arc welding apparatus comprising alternating current supply conductors, a welding circuit, a full wave rectifier bridge having alternating current input terminals connected to said alternating current supply conductors and direct current output terminals connected to said welding circuit, a pair of selfsaturating reactors each having a load circuit coil and a flux resetting winding encircling a core of magnetic material with a substantially rectangular hysteresis loop characteristic and each having its load circuit coil connected in a different one of the alternately conducting adjacent arms of said rectifier bridge, a flux setting circuit for each of said reactors comprising a resistor and a rectifier connected in series circuit with one another and the load circuit coil of its respective reactor across said input terminals of said rectifier bridge, each of said rectifiers being poled to pass current through its associated reactor load circuit coil in the same direction as current flows therethrough due to its connection in said rectifier bridge circuit when said welding circuit is closed, means synchronized with the alternating current of said alternating current supply conductors for generating electrical pulses of predetermined duration and spacing from one another, and means actuated by said spaced electrical pulses for controlling the energization of said reset windings of said saturable reactors to produce pulses of welding current flow through said rectifier bridge to said welding circuit from said alternating current supply conductors during half cycle periods thereof which are spaced from one another in time by one or more full cycle periods thereof.

24. Arc welding apparatus comprising alternating current supply conductors, a welding circuit, a full wave rectifier bridge having alternating current input terminals connected to said alternating current supply conductors and direct current output terminals connected to said welding circuit, a pair of selfsaturating reactors each having a load circuit coil and a flux resetting winding encircling a core of magnetic material with a substantially rectangular hysteresis loop characteristic and each having its load circuit coil connected in a different one of the alternately conducting adjacent arms of said rectifier bridge, a flux setting circuit for each of said reactors comprising a resistor and a rectifier connected in series circuit with one another and the load circuit coil of its respective reactor across said input terminals of said rectifier bridge, each of said rectifiers being poled to pass current through its associated reactor load circuit coil in the same direction as current flows therethrough due to its connection in said rectifier bridge circuit when said welding circuit is closed, means synchronized with the alternating current of said alternating current supply conductors for generating electrical pulses of predetermined duration and spacing from one another, and means actuated by said spaced electrical pulses during the time periods thereof for energizing said reset windings of said saturable reactors after each flux setting period of current flow in said load circuit coils of said saturable reactors and for deenergizing said reset windings of said saturable reactors during the time periods between said electrical pulses.

25. Arc welding apparatus comprising alternating current supply conductors, a welding circuit, means including a rectifier connected between said alternating current supply conductors and said welding circuit for supplying direct current thereto in an amount sufficient to maintain an arc between a fusible electrode and a workpiece connected therein without causing a transfer of metal from said electrode to said workpiece, and means for also supplying to said welding circuit spaced pulses of current of a polarity corresponding to the polarity of said direct current supply means and of a magnitude when added to the current supplied by said direct current supply means to produce current flow through said electrode at densities sufficient to cause a spray transfer of metal from said electrode to the workpiece, said means including a full wave rectifier bridge having alternating current input terminals connected to said alternating current supply conductors and direct current output terminals connected to said welding circuit, a pair of selfsaturating reactors each having a load circuit coil and a flux resetting winding encircling a core of magnetic material with a substantially rectangular hysteresis loop characteristic and each having its load circuit coil connected in a different one of the alternately conducting adjacent arms of said rectifier bridge, a flux setting circuit for each of said reactors comprising a resistor and a rectifier connected in series circuit with one another and the load circuit coil of its respective reactor across said input terminals of said rectifier bridge, each of said rectifiers being poled to pass current through its associated reactor load circuit coil in the same direction as current flows therethrough due to its connection in said rectifier bridge circuit when said welding circuit is closed, and means for energizing during spaced predetermined periods of time said reset windings of said saturable reactors after each flux setting period of current flow in said load circuit coils of said saturable reactors to prevent current flow through said rectifier bridge to said welding circuit and for deenergizing at least one of said reset windings during the time intervals between said spaced predetermined periods of time to permit a pulse of current to flow through said rectifier bridge to said welding circuit.

26. The method of arc welding which comprises maintaining an arc between a consumable electrode and a workpiece by supplying through said electrode a keep-alive current flow for said arc and pulses of welding current flow which during their occurrence are sufficient to produce an axial spray transfer of molten metal from said electrode to the workpiece, and controlling the value of said keep-alive current flow relative to the times between said pulses of welding current flow so that the time between successive pulses of said welding current flow terminates before a globule of molten metal can form and transfer from said electrode to the workpiece due to the flow of said keep-alive current through said electrode.

27. The method of arc welding which comprises maintaining an arc between a consumable electrode and a workpiece by supplying through said electrode a keep-alive current flow for said arc, superimposing on said keep-alive current flow through said electrode periodic values of current which in combination with said keep-alive current flow are sufficient to produce an axial spray transfer of molten metal from said electrode to the workpiece, and controlling the value of said keep-alive current flow relative to the time between successive values of said periodic current flow to prevent a transfer of molten metal from said electrode to the workpiece during the time between successive values of said periodic current flow.

28. The method of securing an axial spray transfer of weld metal through a welding arc from a consumable electrode to a workpiece for only a fraction of the total operating time of said arc, said method comprising maintaining said arc with a keep-alive arc current flow through said electrode, producing a spray transfer of molten metal from said electrode to the workpiece by supplying through said electrode to said arc discrete pulses of current flow which are of sufficient magnitude when added to said keep-alive current flow to produce spray transfer of molten metal from said electrode to the workpiece during the occurrence of said pulses, and controlling the value of said keep-alive current flow relative to the time between said pulses of current flow so that metal transfer from said electrode to the workpiece occurs only during the application of said pulses of current flow to said keep-alive current flow.

29. Arc welding apparatus comprising means for supplying between a consumable electrode and a workpiece pulses of current flow which are sufficient in magnitude to produce during their occurrence an axial spray deposit of molten metal from said electrode to the workpiece, and means for supplying between said electrode and the workpiece an arc keep-alive current which in itself is insufficient to produce a transfer of metal from said electrode to the workpiece during the times between successive pulses of current supplied by said first-mentioned means.

30. Arc welding apparatus comprising means for supplying through a consumable electrode to a workpiece an arc keep-alive current flow and pulses of current flow having magnitudes which when added to said arc keep-alive current flow will produce during the occurrence of said pulses an axial spray transfer of molten metal from said electrode to the workpiece, and means for controlling the times between said pulses of current flow relative to the magnitude of said arc keep-alive current flow so that each of said times terminates before a globule of molten metal that may be forming on said electrode can transfer to the workpiece.

References Cited in the file of this patent

UNITED STATES PATENTS

| | | |
|---|---|---|
| 2,235,385 | Rava | Mar. 18, 1941 |
| 2,495,155 | Ankenman | Jan. 17, 1950 |
| 2,504,868 | Muller et al. | Apr. 18, 1950 |
| 2,697,160 | Williams | Dec. 14, 1954 |
| 2,777,973 | Steele et al. | Jan. 15, 1957 |
| 2,784,349 | Anderson | Mar. 5, 1957 |
| 2,886,696 | Tuthill et al. | May 12, 1959 |
| 2,904,744 | Lalio | Sept. 15, 1959 |
| 2,909,649 | Landis et al. | Oct. 20, 1959 |
| 2,954,519 | House | Sept. 27, 1960 |